United States Patent Office 3,549,652
Patented Dec. 22, 1970

1

3,549,652
TRICYCLIC COMPOUNDS
William R. J. Simpson, Morris Plains, N.J., assignor to Sandoz-Wander, Inc., Hanover, N.J., a corporation of Delaware
No Drawing. Filed Feb. 19, 1968, Ser. No. 706,636
Int. Cl. C07d 85/48
U.S. Cl. 260—307                                     8 Claims

ABSTRACT OF THE DISCLOSURE

2 - lower alkyl-5,6-dihydro-4H-benzo[3,4]cyclohepta-[1,2-d]oxazol-4-ones are prepared from 2-lower alkyl-4-halo - 6H - benzo[3,4]cyclohepta[1,2-d]oxazoles by treating the latter with concentrated sulfuric acid to form an intermediate which is then hydrolyzed. The product oxazolones are useful as diuretics.

---

This invention relates to a process for the preparation of 2-lower alkyl-5,6-dihydro - 4H - benzo[3,4]cyclohepta-[1,2-d]oxazole-4-ones of the formula

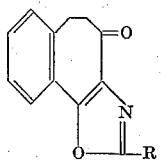

wherein
R is lower alkyl, preferably having from 1 to 4 carbon atoms, e.g., methyl, ethyl, propyl and butyl, from a compound of the formula

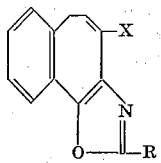

wherein
X is a halogen atom having an atomic weight of from 35 to 80, i.e., a chlorine atom or a bromine atom, and
R is as defined above.

Generally speaking, the process involves intimately contacting a compound II with concentrated sulfuric acid to form an intermediate (Step A) and then subjecting the intermediate to hydrolyzing conditions to form the corresponding compound I (Step B).

The sulfuric acid reaction in Step A should be used under such conditions and in an amount such that the sulfuric acid is present in the reaction medium as concentrated sulfuric acid, e.g., water should not be present in an amount which would reduce the concentration of the sulfuric acid to below 24 normal concentration.

Step A is conveniently carried out at ambient temperatures, i.e. from 15 to 25° C. The concentrated sulfuric acid should be used in an amount sufficient to furnish at least one mol (two equivalents) of sulfuric acid per mol of compound II. If desired, a solvent which is inert under the reaction conditions may be employed, however, it is preferred to use the concentrated sulfuric acid in large excess to serve as reaction medium. Preferably at least 5 mols of sulfuric acid are used per mol of compound II. A highly efficient means of carrying out Step A is to introduce solid compound II in a finely divided form, e.g., powdered, and agitate the reaction mixture until no solids remain undissolved.

The hydrolysis step (Step B) is carried out in a conventional manner, e.g., it is conveniently carried out by drowning the intermediate formed in Step A without separation from the reaction mixture of Step A, in a relatively large volume of cold water (below about 20° C.). Where a large excess of concentrated sulfuric acid is present in the reaction mixture of Step A, the conventional precautions employed in mixing concentrated sulfuric acid and water should be exercised, e.g., the reaction mixture of Step A should be cautiously added to a large volume of cold water, preferably ice-water. The resulting compound I may be recovered by conventional means, e.g., by extraction.

Compounds II are obtainable by process involving a sequence of steps, i.e. nitrosating (Step C) 6,7,8,9-tetrahydro-5H-benzocyclohepten - 5 - one (compound III) to form the corresponding 6-isonitroso-6,7,8,9-tetrahydro-5H-benzocyclohepten-5-one (compound IV) which is then acylated in the presence of a hydrogen halide (Step D) to form the corresponding compound II.

Step C, i.e. the nitrosation of 6,7,8,9-tetrahydro-5H-benzocyclohepten-5-one (compound III) is conveniently effected in conventional manner employing an appropriate inert organic solvent, e.g., benzene, toluene and diethyl ether, and a nitrite, preferably a lower alkyl nitrite such as ethyl nitrite, butyl nitrite or amyl nitrite. Preferably the reaction is carried out at room temperature (20° C.) or below and in the presence of a strong anhydrous acid or base, such as hydrochloric acid or sodium methoxide, respectively. 6,7,8,9-tetrahydro - 5H - benzocyclohepten-5-one is known and can be prepared as described in the literature.

In Step D of the process, the 6-isonitroso-6,7,8,9-tetrahydro-5H-benzocyclohepten-5-one (compound IV) is converted to the compound II by treatment with an appropriate acylating agent in the presence of HX, i.e. a hydrogen halide wherein X is as defined above. The choice of acylating agent is not critical and any acylating agent which is capable of converting an isonitroso group to an alkanoyloxyimino group can be used. For convenience, such agents are referred to hereinafter as alkanoylating agents. For purposes of this invention the term "alkanoylating agent" is defined as an acylating agent which is capable of introducing an alkanoyl substituent into an organic compound. Suitable alkanoylating agents which may be employed include the lower alkanoic acids, e.g., acetic acid, propionic acid and butyric acid, the corresponding acid anhydrides thereof, e.g., acetic anhydride, propionic anhydride and butyric anhydride, mixtures of lower alkanoic acids and their corresponding anhydrides, e.g., acetic acid and acetic anhydride, propionic acid and propionic anhydride and butyric acid and butyric anhydride, lower alkanoyl halides, e.g., acetyl chloride, propionyl chloride and butyryl chloride, and mixtures of alkanoyl halides with the corresponding alkanoic acids and/or anhydrides such as mentioned above. Preferred alkanoylating agents are those having a

moiety; R being as defined above. The alkanoylating agent should be essentially water-free.

The hydrogen halide (HX) used in Step D is preferably one wherein X is a chlorine atom, i.e. hydrogen chloride. The hydrogen halide may be added directly to the reaction mixture or formed in situ, e.g., from a suitable alkanoyl halide. The reaction can be carried out in an inert organic solvent if desired. However, the use of a solvent is not necessary since an excess of the acylating agent can be employed for this purpose. If a solvent is employed, the choice thereof is not critical and any inert organic solvent conventionally used with acylating agents of the type mentioned above can be employed, e.g., toluene or dioxane. Similarly, the temperature at which the reaction is effected is not critical. The particular temperature employed is for the most part dependent on the particular reactants used. In general, it is desirable to carry out the reaction at an elevated temperature of from about 60° C. to about 150° C. Preferably, the reaction is carried out at from 80° C. to about 110° C. The reaction is generally complete within several minutes to 3 hours depending upon the particular condition and reactants employed.

The reaction medium of Step D should be strongly acidic. Suitable acid should be used and in an amount so as to maintain strongly acidic conditions in the reaction mixture. Desirably, the reaction is carried out in the presence of at least 2 moles of HX acid per mole of compound IV. Preferably, from 2.5 to 3 moles of HX acid per mole of reactant is employed. It is further desirable that the acidity of the reaction mixture is such that an aliquot portion thereof when diluted with water (1:10) gives a pH reading of not higher than 2 and preferably is in the range of from 0.5 to 1.5. Such acidic conditions may be provided wholly by the HX acid or in part, supplemented by strong acid, e.g., mineral acid such as sulfuric acid.

Step D results in the formation of a mixture of compounds including compounds I and II. Compound II is recoverable from the reaction mixture by conventional means, e.g., fractional crystallization or chromatography. In general, compounds I are readily soluble in ether, i.e. diethyl ether, which characteristic can be employed to affect recovery.

The preparation of compounds I, starting from compound III, is conveniently illustrated by the following reaction scheme wherein X and R are as defined above:

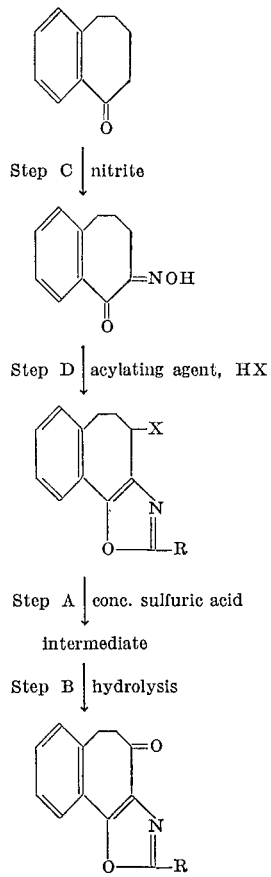

The compounds I are useful as diuretics as indicated by the method of Roy Aston on the unanethetized white rat (Toxicol. and Appl. Pharm., 1: 277, 1959). For such use the compounds may be admixed with conventional pharmaceutical carriers or diluents and administered internally in the form of tablets, capsules, elixirs, solutions or suspensions. The dosage administered will, of course, vary depending upon the compound employed, mode of administration and treatment desired. In general satisfactory results are obtained when these compounds are administered at a daily oral dosage of from about 25 milligrams to about 100 milligrams per kilogram of animal body weight for small mammals. This daily dosage is preferably administered 2 to 4 times a day, or in sustained release form. For large mammals the total daily oral dosage is from about 75 milligrams to about 400 milligrams. Dosage forms suitable for oral administration comprise from about 18.75 milligrams to about 200 milligrams of the active compound in intimate admixture with a solid or liquid pharmaceutically acceptable carrier or diluent.

Pharmaceutical compositions containing compounds I may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents, such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and absorption in the gastro-intestinal tract, if desired. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin.

A representative formulation suitable for oral administration is a tablet prepared by standard tabletting techniques which contains the following:

| Ingredient: | Parts by weight |
| --- | --- |
| 2-methyl-5,6-dihydro-4H-benzo[3,4]cyclohepta[1,2-d]oxazol-4-one | 18.75 |
| Tragacanth | 2 |
| Lactose | 70.75 |
| Corn starch | 5 |
| Talcum | 3 |
| Magnesium stearate | 0.50 |

The following examples illustrate the process of this invention. However, it is to be understood that the examples are for purposes of illustration only and are not intended as in any way limiting the scope of the invention which is defined in the appended claims.

EXAMPLE 1

2 - methyl - 5,6-dihydro-4H-benzo[3,4]cyclohepta[1,2-d]-oxazol-4-one

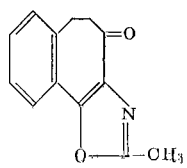

Step A.—Preparation of 6-isonitroso-6,7,8,9-tetrahydro-5H-benzocyclohepten-5-one To a solution of 50 g. of 6,7,8,9-tetrahydro-5H-benzocyclohepten-5-one in 210 ml. of 0.35 N absolute ethereal hydrochloric acid is added, over a period of 15 minutes, 32.2 g. of n-butyl nitrite while maintaining the temperature of the reaction mixture between 15° to 20° C. (by external cooling). After crystallization commences petroleum ether is added and the resulting crystalline material filtered off and washed with petroleum ether to obtain 6-isonitroso-6,7,8,9-tetrahydro-5H-benzocyclohepten-5 - one, M.P. 139° to 141° C.

Step B.—Preparation of 2-methyl-4-chloro-6H-benzo-[3,4]cyclohepta[1,2-d]oxazole

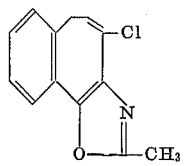

To a mixture of 4200 ml. of glacial acetic acid and 440 ml. of acetic anhydride, kept at 70° C., there is added, in 10 minutes, 378 g. of 6-isonitroso-6,7,8,9-tetrahydro-5H-benzocyclohepten-5-one and the resulting solution is stirred at 75° to 85° C. for 15 minutes. Thereafter, over 30 minutes, 600 ml. of acetyl chloride is dropped in, the temperature being maintained at 85° C. After additional 50 minutes at that temperature, cooling is applied. At 30° C., 700 g. of anhydrous sodium acetate is added in a rate, that the temperature does not exceed 50° C. The mixture is then evaporated in vacuo to about 1500 g. of residue, which is then taken up in 5 liters of benzene and 2 liters of water. The aqueous phase is separated and the benzene phase is washed 3 times with 3 liter portions of 2 N sodium hydroxide solution, then with 3 times with 1 liter portions of water. The benzene solution is dried over sodium sulfate and then evaporated to dryness to give a neutral residue. The residue is stirred with 1500 ml. of ether, first at 20° C., then at 10° C., whereupon solids form and are separated by filtration. The filtrate is evaporated to dryness to give a slowly crystallizing dark oil. This oil is distilled at 135° to 140°/0.1 mm. to give a viscous oil, which crystallized on standing. The crystalline product is then stirred with ethyl acetate-hexane (1:5) yielding crude 2-methyl-4-chloro - 6H - benzo[3,4]cyclohepta[1,2-d]oxazole; (M.P. 88° to 89° C.) which is then distilled under vacuum and recrystallized from ethyl acetate-hexane (1:5) yielding purified 2-methyl-4-chloro-6H-benzo[3,4]cyclohepta[1,2 - d]oxazole; M.P. 104° to 106° C.

Step C.—Preparation of 2-methyl-5,6-dihydro-4H-benzo-[3,4]cyclohepta[1,2-d]oxazol-4-one 60 g. of 2-methyl-4-chloro-6H-benzo[3,4]cyclohepta-[1,2-d]oxazole is dissolved in 130 ml. of concentrated sulfuric acid (36 normal) and the resulting solution is then stirred at room temperature for 15 hours. The reaction mixture is then slowly poured onto 1500 g. of ice and then extracted thrice with 200 ml. portions of chloroform. The combined extracts are dried over anhydrous sodium sulfate and then concentrated to obtain a dark oil. The dark oil is dissolved in ethyl acetate-heptane (1:1) and crude title compound is crystallized from the solution. The crude title compound is then recrystallized from ethyl acetate-heptane (1:1); to yield 44 g. of 2-methyl-5,6-dihydro-4H-benzo[3,4]cyclohepta[1,2-d]oxazol - 4 - one as white crystals, M.P. 115° C.

EXAMPLE 2

Step C of Example 1 is repeated except that 100 g. of 2 - methyl - 4-chloro-6H-benzo[3,4]cyclohepta[1,2-d]oxazole and 150 ml. of concentrated sulfuric acid (36 normal) are employed resulting in a high yield of 2-methyl-5,6-dihydro-4H-benzo[3,4]cyclohepta[1,2-d]oxazol-4-one.

What is claimed is:

1. A process for the preparation of a compound of the formula

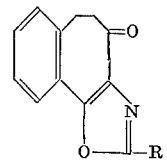

wherein R is lower alkyl, comprising reacting a halogen-substituted compound of the formula

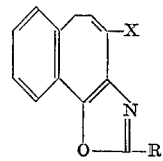

wherein

X is a halogen atom having an atomic weight of from 35 to 80, and

R is as defined above, with concentrated sulfuric acid, and then hydrolyzing the resultant reaction product.

2. A process of claim 1 wherein the halogen-substituted compound is dissolved in the concentrated sulfuric acid.

3. A process of claim 2 wherein the hydrolysis is effected by contacting the intermediate with water, said water having a temperature not above 20° C.

4. A process of claim 1 wherein X is a chlorine atom.

5. A process of claim 4 wherein R is methyl.

6. A process of claim 1 wherein the concentration of the sulfuric acid in the reaction mixture is at least 24 normal.

7. A process of claim 1 wherein the sulfuric acid is present in a ratio of at least 5 mols per mol of the halogen-substituted compound.

8. A process of claim 1 wherein the halogen-substituted compound is reacted with the concentrated sulfuric acid at a temperature of from 15° to 25° C.

References Cited

UNITED STATES PATENTS 3,408,360   10/1968   Galantay _____ 260—307

ALEX MAZEL, Primary Examiner

R. V. RUSH, Assistant Examiner

U.S. Cl. X.R.

424—272